US012401901B2

(12) United States Patent
Sakamoto et al.

(10) Patent No.: US 12,401,901 B2
(45) Date of Patent: Aug. 26, 2025

(54) DRIVING APPARATUS AND DRIVING METHOD FOR DRIVING LENS WITH CORRECTED TILT

(71) Applicant: Asahi Kasei Microdevices Corporation, Tokyo (JP)

(72) Inventors: Ryota Sakamoto, Tokyo (JP); Takumi Yokobori, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 289 days.

(21) Appl. No.: 18/067,736

(22) Filed: Dec. 19, 2022

(65) Prior Publication Data

US 2023/0228874 A1 Jul. 20, 2023

(30) Foreign Application Priority Data

Jan. 20, 2022 (JP) .................................. 2022-007064
Nov. 4, 2022 (JP) .................................. 2022-177005

(51) Int. Cl.
    *H04N 23/68* (2023.01)
(52) U.S. Cl.
    CPC ....... *H04N 23/687* (2023.01); *H04N 23/6815* (2023.01)
(58) Field of Classification Search
    CPC .. H04N 23/687; H04N 23/6815; G02B 7/102; G02B 27/646; G03B 5/06; G03B 2205/0023; G03B 2205/0069; G03B 13/36
    See application file for complete search history.

(56) References Cited

U.S. PATENT DOCUMENTS

| 8,976,469 | B2 * | 3/2015 | Ku .......................... G02B 7/28 |
| | | | 348/222.1 |
| 9,904,153 | B2 * | 2/2018 | Shimizu ............... G03B 21/142 |
| 11,039,071 | B2 | 6/2021 | Min |
| 11,997,386 | B2 * | 5/2024 | Oh ..................... H04N 23/6812 |
| 2005/0213111 | A1 | 9/2005 | Suzuki |
| 2008/0225126 | A1 * | 9/2008 | Mogamiya ............. H04N 23/68 |
| | | | 348/208.4 |
| 2009/0034950 | A1 | 2/2009 | Takagi |

(Continued)

FOREIGN PATENT DOCUMENTS

| CN | 113489910 A | 10/2021 |
| JP | 2000207027 A | 7/2000 |

(Continued)

*Primary Examiner* — Padma Haliyur (57) ABSTRACT

Provided is a driving apparatus including: a calculation unit which calculates a driving amount of an optical element based on a detection position and target position of the optical element; a correction unit which generates a correction driving amount obtained by correcting the driving amount based on the driving amount, a parameter corresponding to a tilt of the optical element, and either the detection position or the target position, and outputs the driving amount and the correction driving amount; a first driving unit which applies a first driving force corresponding to either one of the driving amount or the correction driving amount to a first driving source out of driving sources for moving the optical element in a predetermined direction; and a second driving unit which applies a second driving force corresponding to another one of the driving amount or the correction driving amount to a second driving source.

21 Claims, 7 Drawing Sheets

(56) References Cited

U.S. PATENT DOCUMENTS

| | | | |
|---|---|---|---|
| 2010/0295496 A1 | 11/2010 | Okita | |
| 2011/0292270 A1* | 12/2011 | Nakamura | H04N 23/65 |
| | | | 348/335 |
| 2012/0050577 A1* | 3/2012 | Hongu | G02B 7/102 |
| | | | 348/240.1 |
| 2013/0258506 A1 | 10/2013 | Lee | |
| 2014/0104482 A1* | 4/2014 | Muramatsu | H04N 23/6812 |
| | | | 348/345 |
| 2015/0036011 A1* | 2/2015 | Wakamatsu | H04N 23/685 |
| | | | 348/208.7 |
| 2015/0277139 A1* | 10/2015 | Shibata | H04N 23/687 |
| | | | 359/557 |
| 2016/0044246 A1* | 2/2016 | Yamada | H04N 23/6812 |
| | | | 348/349 |
| 2016/0202445 A1* | 7/2016 | Yamamoto | G02B 27/646 |
| | | | 359/823 |
| 2016/0212344 A1 | 7/2016 | Takeuchi | |
| 2016/0269644 A1* | 9/2016 | Cheong | G02B 27/646 |
| 2016/0327806 A1* | 11/2016 | Kasamatsu | G02B 27/646 |
| 2017/0244899 A1* | 8/2017 | Abe | H04N 23/54 |
| 2017/0358101 A1* | 12/2017 | Bishop | H04N 23/687 |
| 2018/0184005 A1* | 6/2018 | Morotomi | H04N 23/6812 |
| 2018/0234529 A1 | 8/2018 | Yu | |
| 2018/0307004 A1* | 10/2018 | Nagaoka | H04N 23/55 |
| 2019/0215463 A1 | 7/2019 | Shirane | |
| 2019/0285967 A1 | 9/2019 | Himei | |
| 2020/0026154 A1 | 1/2020 | Kawai | |
| 2020/0099859 A1 | 3/2020 | Uchiyama | |
| 2020/0116975 A1* | 4/2020 | Sakamoto | G02B 7/08 |
| 2020/0153366 A1 | 5/2020 | I | |
| 2020/0195849 A1 | 6/2020 | Byun | |
| 2021/0096389 A1 | 4/2021 | Kim | |
| 2021/0227110 A1 | 7/2021 | Kang | |
| 2021/0227114 A1 | 7/2021 | Min | |
| 2021/0382844 A1 | 12/2021 | Kim | |
| 2022/0116537 A1 | 4/2022 | Kil | |
| 2022/0264010 A1 | 8/2022 | Ito | |
| 2022/0360713 A1 | 11/2022 | Shin | |
| 2024/0241341 A1* | 7/2024 | Fujii | H04N 23/54 |

FOREIGN PATENT DOCUMENTS

| | | |
|---|---|---|
| JP | 2006101570 A | 4/2006 |
| JP | 5061982 B2 | 10/2012 |
| JP | 2012247578 A | 12/2012 |
| JP | 2013235044 A | 11/2013 |
| JP | 2017083492 A | 5/2017 |
| JP | 2017097109 A | 6/2017 |
| JP | 2018045484 A | 3/2018 |
| JP | 2019013117 A | 1/2019 |
| JP | 2020013087 A | 1/2020 |
| JP | 2020064283 A | 4/2020 |
| KR | 20180067122 A | 6/2018 |
| KR | 20210127658 A | 10/2021 |
| WO | 2021112525 A1 | 6/2021 |

* cited by examiner

FIG.7

DRIVING APPARATUS AND DRIVING METHOD FOR DRIVING LENS WITH CORRECTED TILT

The contents of the following Japanese patent application(s) are incorporated herein by reference:
NO. 2022-007064 filed in JP on Jan. 20, 2022
NO. 2022-177005 filed in JP on Nov. 4, 2022

BACKGROUND

1. Technical Field

The present invention relates to a driving apparatus and a driving method.

2. Related Art

Patent Document 1 describes that "the controller applies a predetermined offset force to a driving force generated in one driving source, and controls a driving force of the other driving source so as to compensate for an imbalance of the driving forces caused by the offset force".

PRIOR ART DOCUMENT

Patent Document

Patent Document 1: Japanese Patent Application Publication No. 2018-045484

SUMMARY

A first aspect of the present invention provides a driving apparatus. The driving apparatus may include a calculation unit configured to calculate a driving amount of an optical element based on a detection position of the optical element and a target position of the optical element. The driving apparatus may include a correction unit to which the driving amount, the detection position, and the target position are input, the correction unit being configured to generate a correction driving amount obtained by correcting the driving amount based on the driving amount, a parameter corresponding to a tilt of the optical element, and either the detection position or the target position, and output the driving amount and the correction driving amount. The driving apparatus may include a first driving unit configured to apply a first driving force corresponding to either one of the driving amount or the correction driving amount to a first driving source out of a plurality of driving sources for moving the optical element in a predetermined direction. The driving apparatus may include a second driving unit configured to apply a second driving force corresponding to another one of the driving amount or the correction driving amount to a second driving source out of the plurality of driving sources.

The correction unit may be configured to correct the driving amount based on a function of the detection position. When a predetermined first coefficient is set as a "coefficient 1" and a predetermined second coefficient is set as a "coefficient 2", the correction unit may be configured to correct a driving current corresponding to the driving amount calculated by the calculation unit using an expression "corrected driving current=driving current×coefficient 1+driving current×detection position×coefficient 2".

The correction unit may be configured to correct the driving amount using a correction table predefined based on the detection position and the driving amount.

The correction unit may be configured to correct the driving amount based on a function of the target position.

When a predetermined first coefficient is set as a "coefficient 1" and a predetermined second coefficient is set as a "coefficient 2", the correction unit may be configured to correct a driving current corresponding to the driving amount calculated by the calculation unit using an expression "corrected driving current=driving current×coefficient 1+driving current×target position×coefficient 2".

The correction unit may be configured to correct the driving amount using a correction table predefined based on the target position and the driving amount.

The correction unit may be configured to be capable of switching whether to use either the detection position or the target position for correcting the driving amount.

The correction unit may include a switching unit configured to make, according to characteristics of the first driving source and the second driving source, a switch between a correction that uses either the detection position or the target position and a correction that does not use the detection position and the target position.

The correction unit may be configured to select, based on the parameter corresponding to the tilt of the optical element, which of the plurality of driving sources is to be used as a reference for correcting the driving amount.

The parameter corresponding to the tilt may indicate a tilt of the optical element that is detected when a maximum current is caused to flow into each of the plurality of driving sources.

The calculation unit may be configured to calculate the driving amount by feedback control that uses the detection position and the target position.

A second aspect of the present invention provides a driving method. The driving method may be a method of driving a plurality of driving sources including a first driving source and a second driving source. The driving method may include detecting a tilt of an optical element. The driving method may include generating a parameter corresponding to the tilt of the optical element. The driving method may include detecting a position of the optical element and outputting a detection position. The driving method may include calculating a driving amount of the optical element based on the detection position of the optical element and a target position of the optical element. The driving method may include generating a correction driving amount obtained by correcting the driving amount based on the driving amount, the parameter corresponding to the tilt of the optical element, and either the detection position or the target position. The driving method may include selecting, based on the parameter corresponding to the tilt of the optical element, which of the first driving source and the second driving source is to be driven by a driving force corresponding to the correction driving amount.

The summary clause does not necessarily describe all necessary features of the embodiments of the present invention. The present invention may also be a sub-combination of the features described above.

DESCRIPTION OF EXEMPLARY EMBODIMENTS

Hereinafter, embodiments of the present invention will be described, but the embodiments do not limit the invention according to the claims. In addition, not all combinations of features described in the embodiments are essential to the solution of the invention.

Figure 1:
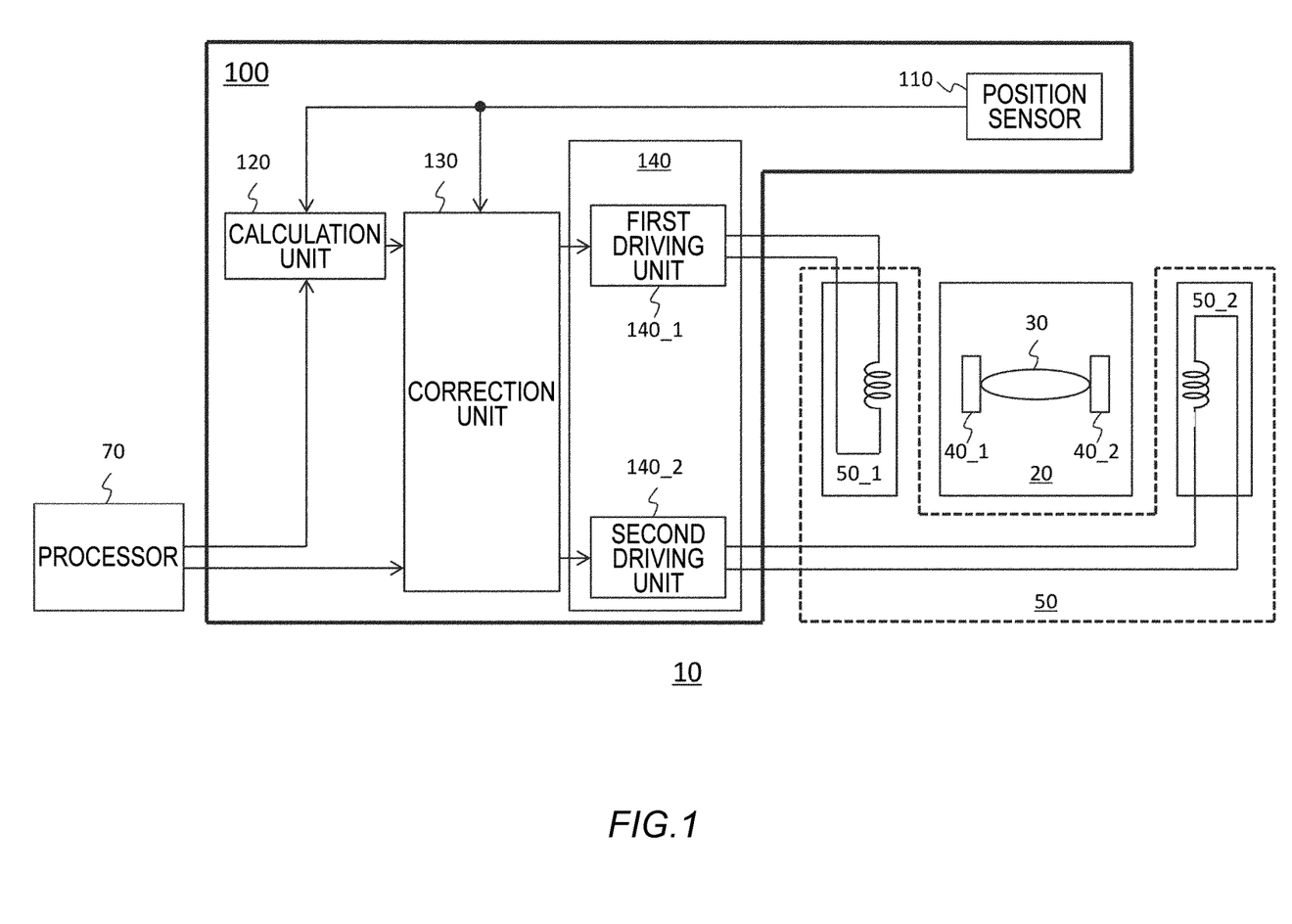
FIG. 1 shows an example of a block diagram of a camera module 10 that may include a driving apparatus 100 according to the present embodiment.

FIG. 1 shows an example of a block diagram of a camera module 10 that may include a driving apparatus 100 according to the present embodiment. It is to be noted that these blocks are functional blocks that are functionally separated, and do not necessarily need to match with actual device configurations. In other words, in the present figure, a unit shown as one block does not necessarily need to be configured by one device. Also, in the present figure, units shown as separate blocks do not necessarily need to be configured by separate devices. The same also applies to other figures.

Further, hereinafter, the camera module 10 will be described as an example, but the present invention is not limited to this. Portable electronic equipment or a position control system having functions similar to those of the camera module 10 to be described below may also be provided. Examples of such equipment or system include a cellular phone, a smartphone, a tablet terminal, a PDA, a portable computer, a laptop, a notebook personal computer, a built-in or external system that controls a position of a lens, and the like. Furthermore, although a lens is taken as an example of an optical element in the descriptions, the optical element may not only be the lens but may also be an image sensor.

The camera module 10 may be capable of executing processing such as Autofocus (AF) or Zoom. In the present embodiment, the camera module 10 executes tilt correction processing for correcting a tilt of a lens in cooperation with the above-described processing or independently from the above-described processing.

The camera module 10 includes an object 20, a plurality of driving sources 50, a processor 70, and a driving apparatus 100.

The object 20 is a device to be driven. Hereinafter, a case where the object 20 is a lens tube will be described as an example. In the object 20, a lens 30 and a first magnet 40_1 and second magnet 40_2 (collectively referred to as magnets 40) are provided integrally.

The lens 30 is an optical element for refracting and converging light. When executing AF processing or Zoom processing, the camera module 10 causes such a lens 30 to move linearly along an optical axis direction so as to perform focusing or zoom in/zoom out.

The magnets 40 are permanent magnets. In the present embodiment, a case where the first magnet 40_1 and the second magnet 40_2 are provided as the magnets 40 is described as an example. For example, the first magnet 40_1 and the second magnet 40_2 may be provided at positions opposing each other with the lens 30 interposed therebetween along the optical axis direction of the lens 30.

The plurality of driving sources 50 are sources of a thrust force for causing the lens 30 to move in a predetermined direction, herein, the optical axis direction of the lens 30. In the present embodiment, a case where the plurality of driving sources 50 include a first driving source 50_1 and a second driving source 50_2 is described as an example. Each of the plurality of driving sources 50 may include a coil, for example. The first driving source 50_1 may include, in the vicinity of the first magnet 40_1, a coil wound along the optical axis direction of the lens 30. In addition, the second driving source 50_2 may include, in the vicinity of the second magnet 40_2, a coil wound along the optical axis direction of the lens 30. In such a plurality of driving sources 50, for example, when a driving current or a driving voltage is supplied and a driving force is applied, a magnetic force is generated between the first driving source 50_1 and the first magnet 40_1 and between the second driving source 50_2 and the second magnet 40_2, and thus this magnetic force becomes a thrust force so that a position of the lens 30 can be moved.

The processor 70 is a processing apparatus that assumes control of the camera module 10. For example, the processor 70 may be communicably connected to the driving apparatus 100 via serial communication, parallel communication, a network, wireless communication, or the like. As an example, I2C (Inter-Integrated Circuit) may be used for such communication. The processor 70 may supply a target position signal indicating a target position of the lens 30 to the driving apparatus 100. In addition, the processor 70 may supply tilt information representing a tilt of the lens 30 to the driving apparatus 100.

The driving apparatus 100 acquires the target position signal and the tilt information from the processor 70. Then, the driving apparatus 100 calculates a driving amount of the lens 30 based on the detection position and target position of the lens 30, and applies a driving force corresponding to the calculation result to the plurality of driving sources 50. At this time, the driving apparatus 100 according to the present embodiment corrects the calculated driving amount based on the position of the lens 30 and the tilt of the lens 30.

The driving apparatus 100 includes a position sensor 110, a calculation unit 120, a correction unit 130, and a plurality of driving units 140. It is to be noted that in the present figure, a case where the plurality of driving units 140 include a first driving unit 140_1 and a second driving unit 140_2 is shown as an example.

The position sensor 110 detects a position of the lens 30. For example, the position sensor 110 may be a magnetic sensor, and may detect the position of the lens 30 by detecting a magnetic field generated by the magnets 40 provided integrally with the lens 30. As an example, such a magnetic sensor may be a Hall element to which a Hall effect is applied and which senses a variation in an external magnetic field from a generated electromotive force, such as a silicon Hall element and a compound Hall element. However, the present invention is not limited to this. The magnetic sensor may be various sensors capable of detecting a magnetic field, such as a spin-valve type magnetoresistance effect element (GMR element, TMR element, or the like) in which a resistance varies according to a variation in the external magnetic field, or may be a combination of these various sensors. Alternatively, the position sensor 110 may be configured by a sensor element group constituted of a plurality of sensor elements. Further, the position sensor 110 may amplify a detected amplitude voltage or current value to be 1 time or more, or may convert it into a digital value by A/D conversion. The position sensor 110 supplies a detection position signal indicating the detection position obtained by detecting the position of the lens 30 to the calculation unit 120. Furthermore, in the present embodiment, the position sensor 110 also supplies the detection position signal to the correction unit 130 in addition to the calculation unit 120. It is to be noted that although the present figure shows a case where the position sensor 110 is built-in in the driving apparatus 100 as an example, the position sensor 110 may be configured separately from the driving apparatus 100 and be externally attached to the driving apparatus 100.

The calculation unit 120 calculates a driving amount of the optical element based on the detection position of the optical element (lens 30) and the target position of the optical element. At this time, the calculation unit 120 may execute a PID calculation. Herein, PID is one type of feedback control and is control in which control of an input value is performed using three elements including a deviation between an output value and a target value, an integral thereof, and a differential thereof. There is proportional control (P control) as basic feedback control. This is to control the input value as a linear function of the deviation between the output value and the target value. An operation of varying the input value in proportion to this deviation is called a proportional operation or a P operation (P is an abbreviation of Proportional). That is, when a state with the deviation continues for a long time, the P operation serves to increase the variation in the input value accordingly to bring it close to the target value. Moreover, an operation of varying the input value in proportion to an integral of this deviation is called an integral operation or an I operation (I is an abbreviation of Integral). Control in which the proportional operation and the integral operation are combined in this manner is called PI control. Further, an operation of varying the input value in proportion to a differential of this deviation is called a differential operation or a D operation (D is an abbreviation of Derivative or Differential). Such control in which the proportional operation, the integral operation, and the differential operation are combined is called PID. That is, the calculation unit 120 executes the PID calculation based on the detection position of the lens 30 detected by the position sensor 110 and the target position of the lens 30 designated by the processor 70, to thus calculate the driving amount of the lens 30. In other words, the calculation unit 120 executes closed loop feedback control so as to move the lens 30 to a target position based on a result of detecting the position of the lens 30. In this manner, for example, the calculation unit 120 can calculate the driving amount by the feedback control that uses the detection position and the target position. The calculation unit 120 supplies the calculation result, that is, information representing the driving amount of the lens 30, to the correction unit 130.

The correction unit 130 is input with the driving amount, the detection position, and the target position, generates a correction driving amount obtained by correcting the driving amount based on the driving amount, a parameter corresponding to a tilt of the optical element (lens 30), and either the detection position or the target position, and outputs the driving amount and the correction driving amount. In the present embodiment, the correction unit 130 corrects the driving amount of the lens 30 based on the detection position of the lens 30 and the tilt of the lens 30. The correction unit 130 outputs the driving amount and the correction driving amount obtained by correcting the driving amount to the plurality of driving units 140. Herein, regarding the parameter corresponding to the tilt of the lens 30, tilt information at each lens position may be acquired in advance in an actuator inspection process or the like, and during an actual operation, the correction unit 130 may perform the correction based on the tilt information that has been acquired in advance.

The first driving unit 140_1 applies a first driving force corresponding to either one of the driving amount or the correction driving amount to the first driving source 50_1 out of the plurality of driving sources 50 for moving the lens 30 in a predetermined direction. More specifically, the first driving unit 140_1 supplies a driving current or driving voltage corresponding to either one of the driving amount calculated by the calculation unit 120 or the correction driving amount generated by the correction unit 130 to the first driving source 50_1, to thus apply the first driving force to the first driving source 50_1.

The second driving unit 140_2 applies a second driving force corresponding to the other one of the driving amount or the correction driving amount to the second driving source 50_2 out of the plurality of driving sources 50. More specifically, the second driving unit 140_2 supplies a driving current or driving voltage corresponding to the other one of the driving amount calculated by the calculation unit 120 or the correction driving amount generated by the correction unit 130 to the second driving source 50_2, to thus apply the second driving force to the second driving source 50_2.

In the plurality of driving sources 50, when such a driving current or driving voltage is supplied, a magnetic force is generated between the first driving source 50_1 and the first magnet 40_1 and between the second driving source 50_2 and the second magnet 40_2, and thus this magnetic force becomes a thrust force so that a position of the lens 30 can be moved. Then, the driving apparatus 100 detects a position to which the lens 30 has moved by the position sensor 110 and feeds back the result to the calculation unit 120, to thereby move the lens 30 to a target position. At this time, according to the driving apparatus 100 of the present embodiment, since the correction unit 130 corrects a driving capability of either one of the first driving source 50_1 or the second driving source 50_2, the lens 30 can be moved without tilting with respect to the optical axis.

It is to be noted that the correction unit 130 may be capable of selecting which of the plurality of driving sources 50 is to be used as a reference for correcting the driving amount. This will be described in detail by using a flow.

Figure 2:
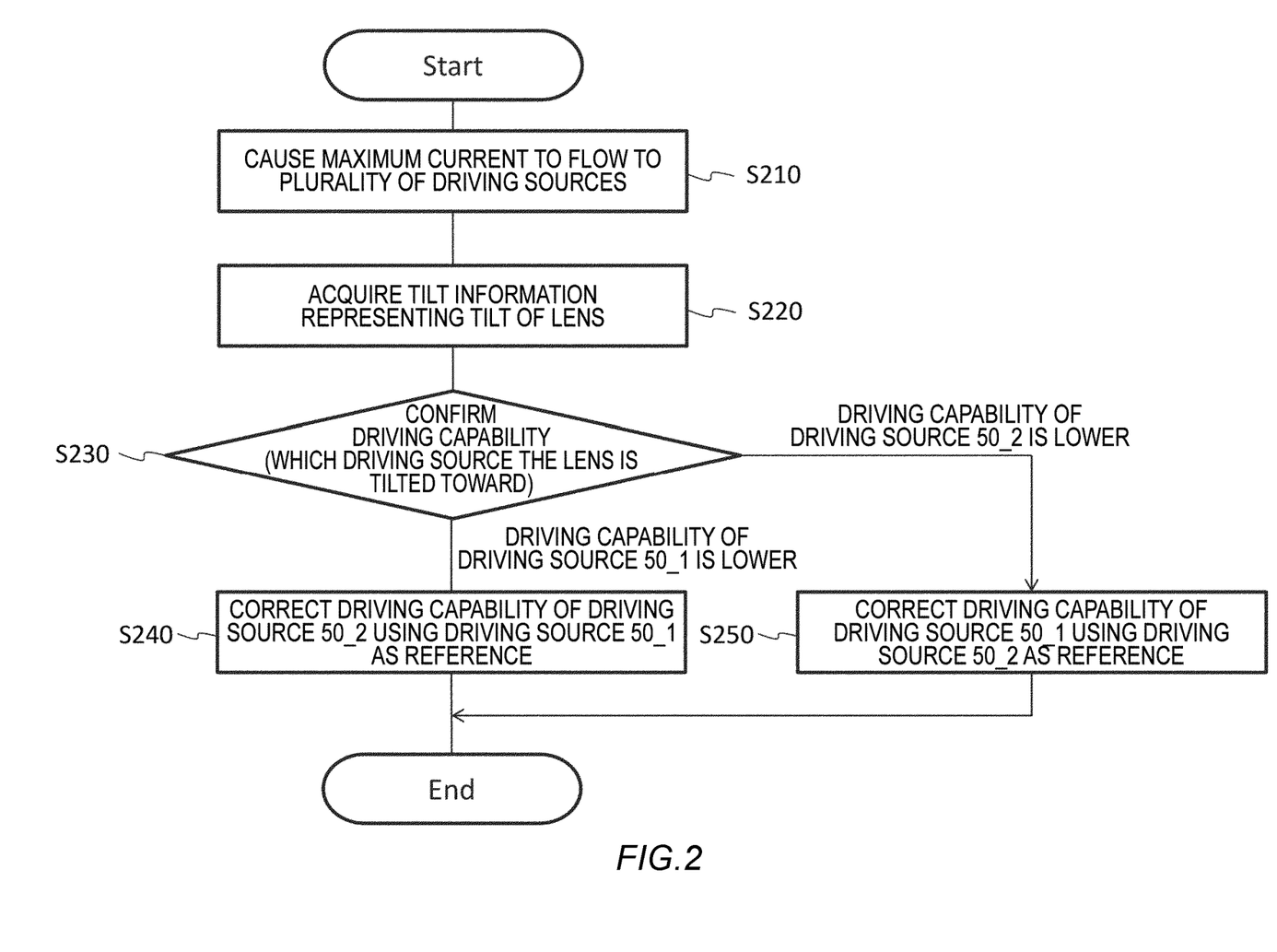
FIG. 2 shows an example of a flow in which the driving apparatus 100 according to the present embodiment executes tilt correction processing.

FIG. 2 shows an example of a flow in which the driving apparatus 100 according to the present embodiment executes tilt correction processing. In Step S210, the driving apparatus 100 causes a maximum current to flow into the plurality of driving sources 50. For example, the plurality of driving units 140 supply a driving current to each of the plurality of driving sources 50 such that the driving current becomes a maximum current.

In Step S220, the driving apparatus 100 acquires tilt information representing a tilt of the lens 30. For example, the correction unit 130 acquires tilt information representing the tilt of the lens 30 from the processor 70. At this time, the parameter corresponding to the tilt of the optical element (lens 30) indicates the tilt of the lens 30 detected when a maximum current is caused to flow into each of the plurality of driving sources 50. It is to be noted that Step S210 and Step S220 may be performed as a part of the actuator inspection process.

In Step S230, the driving apparatus 100 confirms a driving capability. For example, the correction unit 130 confirms which of the first driving source 50_1 and the second driving source 50_2 the lens 30 is tilted toward based on the tilt information acquired in Step S220. In general, the driving capability of the driving source 50 depends on mechanical characteristics of the actuator. At this time, since the lens 30 moves more toward the driving source having a higher driving capability, the lens 30 tilts with respect to the optical axis when there is a difference in the driving capabilities between the plurality of driving sources 50. Herein, it is difficult to correct the lower driving capability so that it matches with the higher driving capability. In this regard, the driving apparatus 100 according to the present embodiment corrects the higher driving capability so that it matches with the lower driving capability. Therefore, the correction unit 130 may select which of the plurality of driving sources 50 is to be used as a reference for correcting the driving amount based on the parameter corresponding to the tilt of the optical element (lens 30).

When determined that the driving capability of the first driving source 50_1 is lower based on the tilt of the lens 30, the driving apparatus 100 advances the processing to Step S240. On the other hand, when determined that the driving capability of the second driving source 50_2 is lower based on the tilt of the lens 30, the driving apparatus 100 advances the processing to Step S250.

In Step S240, the driving apparatus 100 corrects the driving amount calculated by the calculation unit 120 in order to correct the driving capability of the second driving source 50_2 using the first driving source 50_1 as a reference.

In the present embodiment, the correction unit 130 corrects the driving amount calculated by the calculation unit 120 based on the detection position of the lens 30 and the tilt of the lens 30. As an example, when a predetermined first coefficient is set as a "coefficient 1" and a predetermined second coefficient is set as a "coefficient 2", the correction unit 130 corrects the driving current corresponding to the driving amount calculated by the calculation unit 120 using, for example, the following expression "corrected driving current=driving current×coefficient 1+driving current×detection position×coefficient 2". That is, the correction unit 130 corrects the driving amount based on a function of the detection position of the lens 30. More specifically, the correction unit 130 corrects the driving amount by a sum of: a function that uses the driving current corresponding to the driving amount calculated by the calculation unit 120 and the predetermined coefficient 1 as variables; and a function that uses the driving current corresponding to the driving amount calculated by the calculation unit 120, the detection position of the lens 30, and the predetermined coefficient 2 as variables. Herein, at least one of the "coefficient 1" or the "coefficient 2" may be predefined such that it becomes a numerical value corresponding to a magnitude of the tilt of the lens 30.

It is to be noted that although the case where the correction unit 130 corrects the driving amount based on the function of the detection position of the lens 30 is described as an example in the descriptions above, the present invention is not limited to this. The correction unit 130 may correct the driving amount using a correction table predefined based on the detection position of the lens 30 and the driving amount.

Then, the correction unit 130 outputs the correction driving amount obtained by correcting the driving amount to the second driving unit 140_2. Accordingly, the second driving unit 140_2 applies a second driving force corresponding to the correction driving amount to the second driving source 50_2 out of the plurality of driving sources 50. More specifically, the second driving unit 140_2 supplies a corrected driving current to the second driving source 50_2, to thus apply the second driving force to the second driving source 50_2. On the other hand, the correction unit 130 outputs the driving amount not yet subjected to the correction, that is, the driving amount calculated by the calculation unit 120, to the first driving unit 140_1. Accordingly, the first driving unit 140_1 applies a first driving force corresponding to the driving amount not yet subjected to the correction to the first driving source 50_1 out of the plurality of driving sources 50. More specifically, the first driving unit 140_1 supplies a driving current not yet subjected to the correction to the first driving source 50_1, to thus apply the first driving force to the first driving source 50_1. In this manner, the driving apparatus 100 corrects the driving capability of the second driving source 50_2 using the first driving source 50_1 having a lowest driving capability as a reference.

On the other hand, in Step S250, the driving apparatus 100 corrects the driving amount calculated by the calculation unit 120 in order to correct the driving capability of the first driving source 50_1 using the second driving source 50_2 as a reference. It is to be noted that since the correction of the driving amount may be similar to that of Step S240, detailed descriptions will be omitted herein.

Then, the correction unit 130 supplies the correction driving amount obtained by correcting the driving amount to the first driving unit 140_1. Accordingly, the first driving unit 140_1 applies the first driving force corresponding to the corrected driving amount to the first driving source 50_1 out of the plurality of driving sources 50. More specifically, the first driving unit 140_1 supplies the corrected driving current to the first driving source 50_1, to thus apply the first driving force to the first driving source 50_1. On the other hand, the correction unit 130 outputs the driving amount not yet subjected to the correction, that is, the driving amount calculated by the calculation unit 120, to the second driving unit 140_2. Accordingly, the second driving unit 140_2 applies the second driving force corresponding to the driving amount not yet subjected to the correction to the second driving source 50_2 out of the plurality of driving sources 50. More specifically, the second driving unit 140_2 supplies the driving current not yet subjected to the correction to the second driving source 50_2, to thus apply the second driving force to the second driving source 50_2. In this manner, the driving apparatus 100 corrects the driving capability of the first driving source 50_1 using the second driving source 50_2 having a lowest driving capability as a reference.

In recent years, for improving a driving force of a lens due to an increase in a size and weight of the lens, a plurality of driving sources may be used for moving the lens. However, in such a case, when the driving capabilities vary between the plurality of driving sources, a situation where the lens is tilted has occurred.

Patent Document 1 describes a technique of compensating an imbalance of driving capabilities of driving sources by adding an offset to a driving amount. However, Patent Document 1 does not describe anything regarding a tilt correction of an object due to the imbalance of the driving capabilities. Further, when the driving current is supplied as it is to the plurality of driving units without correcting the calculated driving amount, the lens may tilt when moving the lens in the optical axis direction due to the variation in the driving capabilities of the plurality of driving sources. Moreover, even if the driving amount is corrected without considering the position of the lens as in corrected driving current=driving current×coefficient 1+coefficient 2 or the like, in a case where the driving capabilities of the plurality of driving sources vary depending on the position of the lens, there has been a problem that, even when the tilt can be corrected at the lens position x1, the tilt cannot be fully corrected at a different position x2.

In contrast, the driving apparatus 100 according to the present embodiment corrects the driving amount based on the detection position of the lens 30 and the tilt of the lens 30. Then, the driving apparatus 100 according to the present embodiment applies the first driving force corresponding to either one of the driving amount not yet subjected to the correction or the corrected driving amount to the first driving source, and applies the second driving force corresponding to the other one of the driving amount not yet subjected to the correction or the corrected driving amount to the second driving source. Thus, according to the driving apparatus 100 of the present embodiment, even when the plurality of driving sources 50 are used for moving the lens in a predetermined direction, the tilt of the lens 30 due to the imbalance of the driving capabilities between the plurality of driving sources 50 can be corrected according to the position of the lens 30.

At this time, the driving apparatus 100 according to the present embodiment may correct the driving amount based on the function of the detection position. Thus, according to the driving apparatus 100 of the present embodiment, an appropriate correction calculation can be performed according to the position of the lens 30 that has actually been detected. Further, the driving apparatus 100 according to the present embodiment may correct the driving amount using a correction table predefined based on the detection position and the driving amount. Thus, according to the driving apparatus 100 of the present embodiment, a processing load of the correction calculation that is based on the detection position can be reduced.

In addition, the driving apparatus 100 according to the present embodiment may select, based on the tilt of the lens 30, which of the plurality of driving sources 50 is to be used as a reference for correcting the driving amount. At this time, the driving apparatus 100 according to the present embodiment may use, as the tilt of the lens 30, the tilt of the lens 30 that is detected when a maximum current is caused to flow into each of the plurality of driving sources 50. Thus, according to the driving apparatus 100 of the present embodiment, it is possible to correct, after confirming the driving capabilities of the plurality of driving sources 50 based on the tilt of the lens 30 when a maximum current is actually caused to flow, for example, the higher driving capability so that it matches with the lower driving capability.

Figure 3:
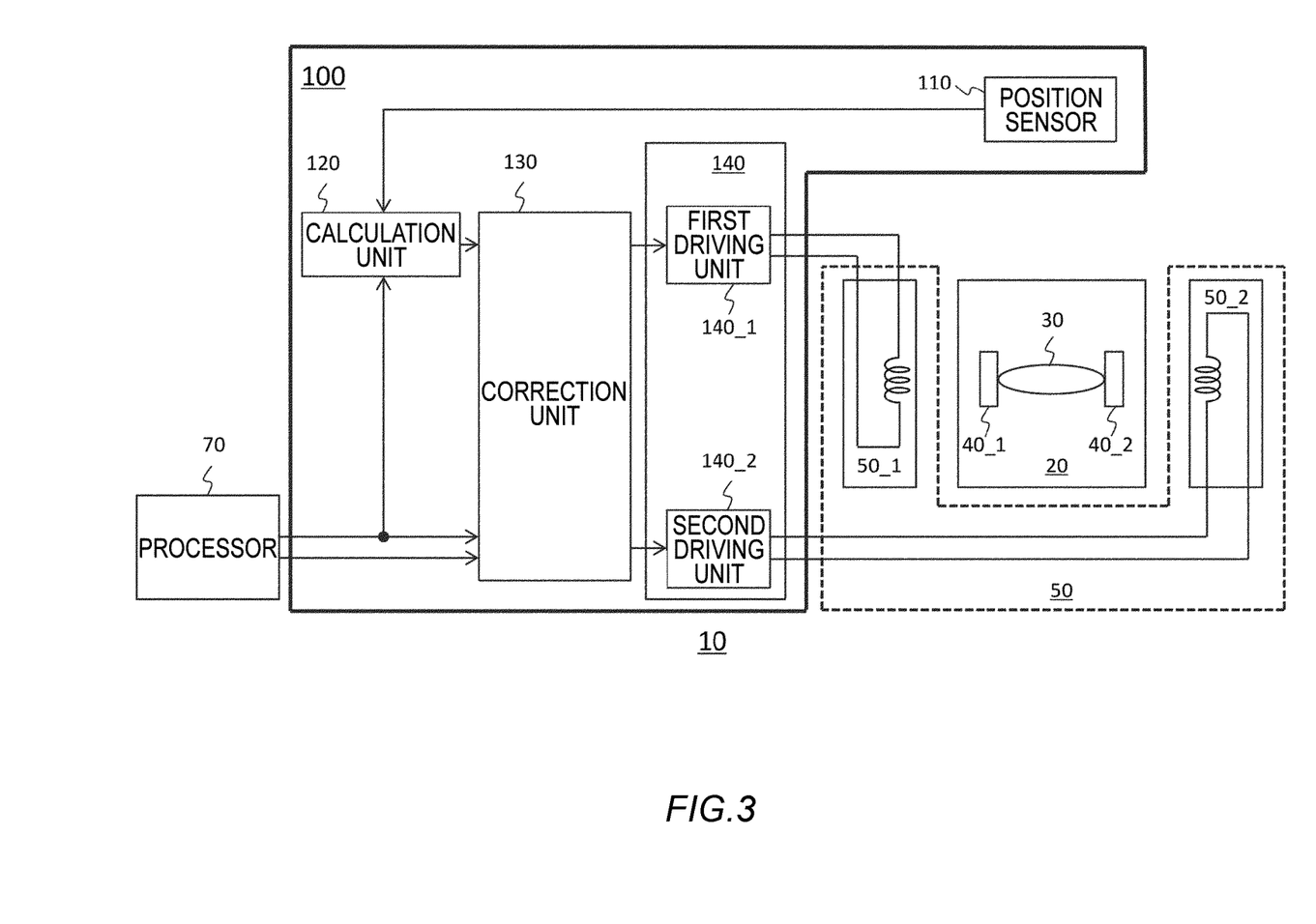
FIG. 3 shows an example of a block diagram of the camera module 10 that may include the driving apparatus 100 according to a second embodiment.

FIG. 3 shows an example of a block diagram of the camera module 10 that may include the driving apparatus 100 according to a second embodiment. In the present figure, components having the same functions and configurations as those of FIG. 1 are denoted by the same reference numerals, and descriptions thereof will be omitted below except for different points. In the embodiment described above, the case where the driving apparatus 100 executes the tilt correction processing based on the detection position of the lens 30 and the tilt of the lens 30 has been described as an example. In the second embodiment, the driving apparatus 100 executes the tilt correction processing based on a target position of the lens 30 and the tilt of the lens 30.

In the second embodiment, the correction unit 130 acquires, instead of acquiring the detection position signal indicating the detection position of the lens 30 from the position sensor 110, a target position signal indicating a target position of the lens 30 from the processor 70.

In addition, in the second embodiment, the correction unit 130 corrects the driving amount calculated by the calculation unit 120 based on the target position of the lens 30 and the tilt of the lens 30. As an example, the correction unit 130 corrects the driving current corresponding to the driving amount calculated by the calculation unit 120 using, for example, the following expression "corrected driving current=driving current×coefficient 1+driving current×target position×coefficient 2". That is, the correction unit 130 corrects the driving amount based on a function of the target position of the lens 30. More specifically, the correction unit 130 corrects the driving amount by a sum of: a function that uses the driving current corresponding to the driving amount calculated by the calculation unit 120 and the predetermined coefficient 1 as variables; and a function that uses the driving current corresponding to the driving amount calculated by the calculation unit 120, the target position of the lens 30, and the predetermined coefficient 2 as variables. Herein, at least one of the "coefficient 1" or the "coefficient 2" may be predefined such that it becomes a numerical value corresponding to a magnitude of the tilt of the lens 30.

It is to be noted that although the case where the correction unit 130 corrects the driving amount based on the function of the target position of the lens 30 is described as an example in the descriptions above, the present invention is not limited to this. The correction unit 130 may correct the driving amount using a correction table predefined based on the target position of the lens 30 and the driving amount.

In this manner, the driving apparatus 100 according to the second embodiment corrects the driving amount based on the function of the target position instead of the detection position. Thus, according to the driving apparatus 100 of the second embodiment, an appropriate correction calculation can be performed according to the target position of the lens 30 designated by the processor 70 instead of the position of the lens 30 that has actually been detected. Moreover, the driving apparatus 100 according to the second embodiment may correct the driving amount using a correction table predefined based on the target position and the driving amount. Thus, according to the driving apparatus 100 of the second embodiment, a processing load of the correction calculation that is based on the target position can be reduced.

It is to be noted that in the descriptions above, the tilt correction processing that is based on the detection position and the tilt correction processing that is based on the target position have been described as different embodiments. However, these tilt correction processing may be used in combination. That is, the driving apparatus 100 may execute the tilt correction processing based on the detection position and target position of the lens and the tilt of the lens. Thus, according to the driving apparatus 100, the correction calculation can be performed according to both the position of the lens 30 that has actually been detected and the target position of the lens 30 designated by the processor 70.

Figure 4:
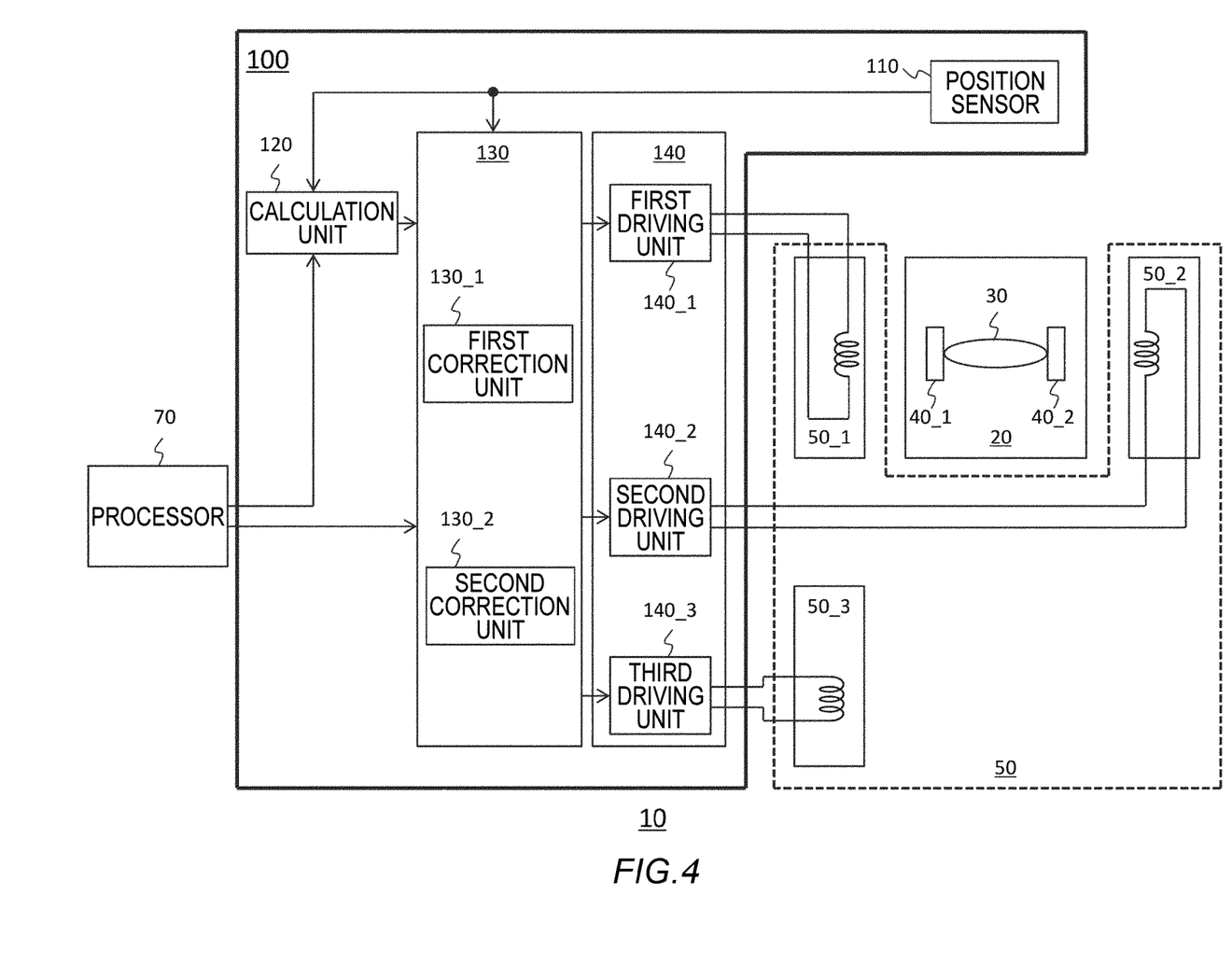
FIG. 4 shows an example of a block diagram of the camera module 10 that may include the driving apparatus 100 according to a third embodiment.

FIG. 4 shows an example of a block diagram of the camera module 10 that may include the driving apparatus 100 according to a third embodiment. In the present figure, components having the same functions and configurations as those of FIG. 1 are denoted by the same reference numerals, and descriptions thereof will be omitted below except for different points. In the embodiments described above, the case where the camera module 10 causes the lens 30 to move using two driving sources has been described as an example. However, the present invention is not limited to this. The camera module 10 may cause the lens 30 to move using three or more driving sources.

In the third embodiment, a case where the plurality of driving sources 50 include a third driving source 50_3 in addition to the first driving source 50_1 and the second driving source 50_2 is described as an example. Further, in association with this, the plurality of driving units 140 include a third driving unit 140_3 in addition to the first driving unit 140_1 and the second driving unit 140_2. The third driving unit 140_3 applies a third driving force corresponding to either the driving amount or the correction driving amount to the third driving source 50_3 out of the plurality of driving sources 50. More specifically, the third driving unit 140_3 supplies a driving current or driving voltage corresponding to either the driving amount calculated by the calculation unit 120 or the correction amount generated by the correction unit 130 to the third driving source 50_3, to thus apply the third driving force to the third driving source 50_3.

In this manner, even when the plurality of driving sources 50 include three or more driving sources, the correction unit 130 may be capable of selecting which driving source is to be used as a reference for correcting the driving amount. That is, the driving apparatus 100 causes a maximum current to flow into each of the plurality of driving sources 50, and confirms the driving capabilities of the plurality of driving sources 50. Then, when determined that the driving capability of the first driving source 50_1 is the lowest, the correction unit 130 corrects the driving capabilities of the second driving source 50_2 and the third driving source 50_3 using the first driving source 50_1 as a reference.

Therefore, in the third embodiment, the correction unit 130 requires a plurality of blocks corresponding to the plurality of driving sources 50 to be correction targets, that is, two blocks including a block for correcting the driving capability of the second driving source 50_2 and a block for correcting the driving capability of the third driving source 50_3 in the example described above. In this regard, in the third embodiment, the correction unit 130 includes a first correction unit 130_1 and a second correction unit 130_2.

In order to correct the driving capability of one of the plurality of driving sources 50 to be the correction targets, that is, the second driving source 50_2 in the example described above, the first correction unit 130_1 corrects the driving amount calculated by the calculation unit 120 based on the detection position of the lens 30 and the tilt of the lens 30. As an example, the first correction unit 130_1 corrects the driving current corresponding to the driving amount calculated by the calculation unit 120 using, for example, the following expression "corrected driving current=driving current×coefficient 1+driving current×detection position×coefficient 2". The first correction unit 130_1 outputs the correction driving amount obtained by correcting the driving amount to the driving unit 140 corresponding to one of the plurality of driving sources 50 to be the correction targets, that is, the second driving unit 140_2 in the example described above.

In order to correct the driving capability of the other one of the plurality of driving sources 50 to be the correction targets, that is, the third driving source 50_3 in the example described above, the second correction unit 130_2 corrects the driving amount calculated by the calculation unit 120 based on the detection position of the lens 30 and the tilt of the lens 30. As an example, when a predetermined third coefficient is set as a "coefficient 3" and a predetermined fourth coefficient is set as a "coefficient 4", the second correction unit 130_2 corrects the driving current corresponding to the driving amount calculated by the calculation unit 120 using, for example, the following expression "corrected driving current=driving current×coefficient 3+driving current×detection position×coefficient 4". Herein, similar to the "coefficient 1" and the "coefficient 2", at least one of the "coefficient 3" or the "coefficient 4" may be predefined such that it becomes a numerical value corresponding to the magnitude of the tilt of the lens 30. The second correction unit 130_2 outputs the correction driving amount obtained by correcting the driving amount to the driving unit 140 corresponding to the other one of the plurality of driving sources 50 to be the correction targets, that is, the third driving unit 140_3 in the example described above.

Also when the lens 30 is moved using four or more driving sources, sub-blocks can similarly be added to the correction unit 130 and the plurality of driving units 50. In this manner, using one of the plurality of driving sources 50 (for example, the first driving source 50_1) as a reference, the driving apparatus 100 according to the third embodiment corrects the driving capabilities of the plurality of driving sources 50 to be the correction targets (for example, the second driving source 50_2 and the third driving source 50_3). Thus, according to the driving apparatus 100 of the third embodiment, also when the lens 30 is moved using three or more driving sources, the tilt of the lens 30 due to an imbalance of the driving capabilities among the plurality of driving sources 50 can be corrected according to the position of the lens 30 that has actually been detected.

Figure 5:
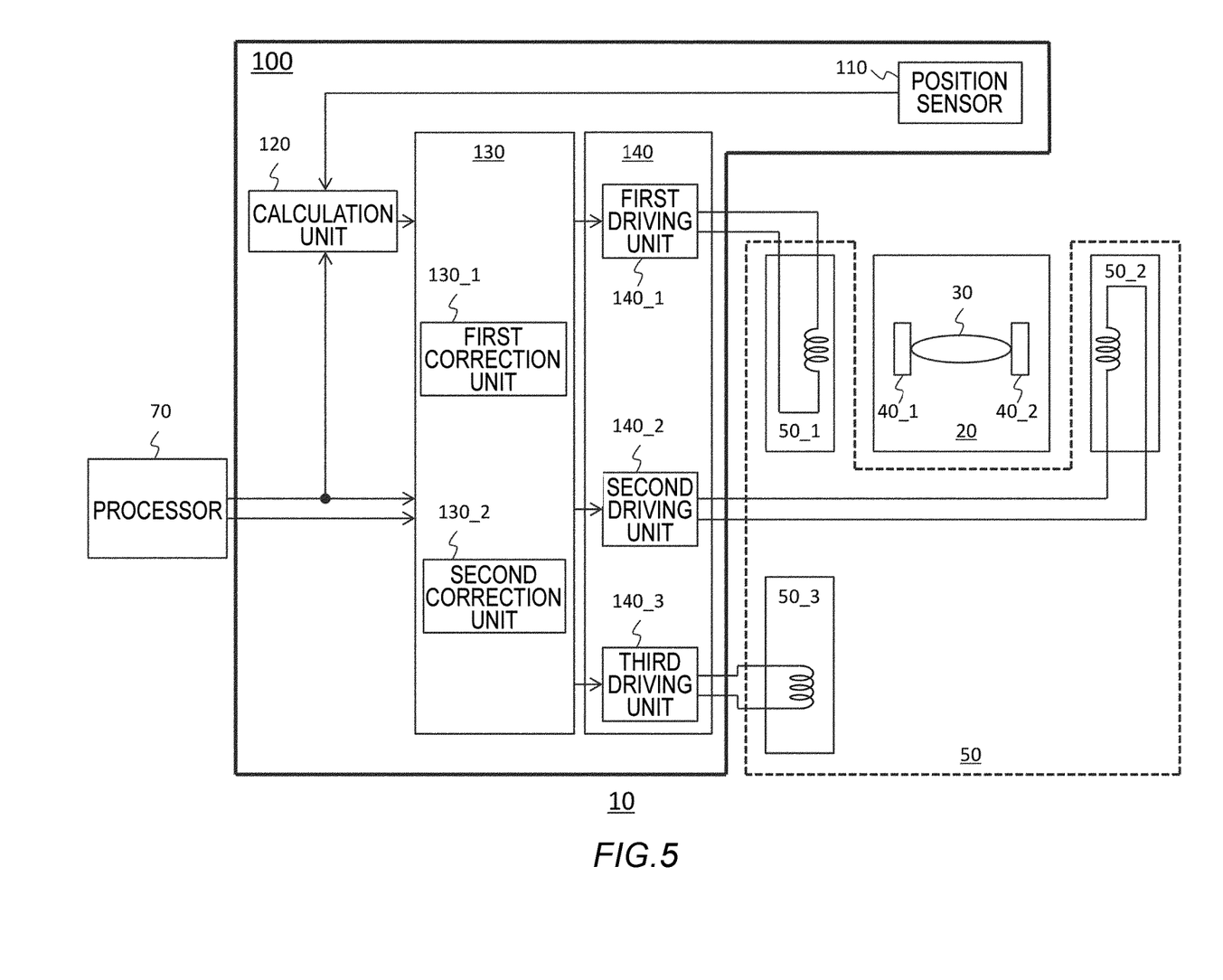
FIG. 5 shows an example of a block diagram of the camera module 10 that may include the driving apparatus 100 according to a fourth embodiment.

FIG. 5 shows an example of a block diagram of the camera module 10 that may include the driving apparatus 100 according to a fourth embodiment. In the present figure, components having the same functions and configurations as those of FIG. 4 are denoted by the same reference numerals, and descriptions thereof will be omitted below except for different points. In the third embodiment, the case where the driving apparatus 100 executes the tilt correction processing based on the detection position of the lens 30 and the tilt of the lens 30 has been described as an example. In the fourth embodiment, similar to the second embodiment, the driving apparatus 100 executes the tilt correction processing based on the target position of the lens 30 and the tilt of the lens 30.

In order to correct the driving capability of one of the plurality of driving sources 50 to be the correction targets, that is, the second driving source 50_2 in the example described above, the first correction unit 130_1 corrects the driving amount calculated by the calculation unit 120 based on the target position of the lens 30 and the tilt of the lens 30. As an example, the first correction unit 130_1 corrects the driving current corresponding to the driving amount calculated by the calculation unit 120 using, for example, the following expression "corrected driving current=driving current×coefficient 1+driving current×target position×coefficient 2".

In order to correct the driving capability of the other one of the plurality of driving sources 50 to be the correction targets, that is, the third driving source 50_3 in the example described above, the second correction unit 130_2 corrects the driving amount calculated by the calculation unit 120 based on the target position of the lens 30 and the tilt of the lens 30. As an example, the second correction unit 130_2 corrects the driving current corresponding to the driving amount calculated by the calculation unit 120 using, for example, the following expression "corrected driving current=driving current×coefficient 3+driving current×target position×coefficient 4".

In this manner, the driving apparatus 100 according to the fourth embodiment corrects the driving amount based on the function of the target position instead of the detection position. Thus, according to the driving apparatus 100 of the fourth embodiment, also when the lens 30 is moved using three or more driving sources, the tilt of the lens 30 due to the imbalance of the driving capabilities among the plurality of driving sources 50 can be corrected according to the target position of the lens 30 designated by the processor 70 instead of the position of the lens 30 that has actually been detected.

Figure 6:
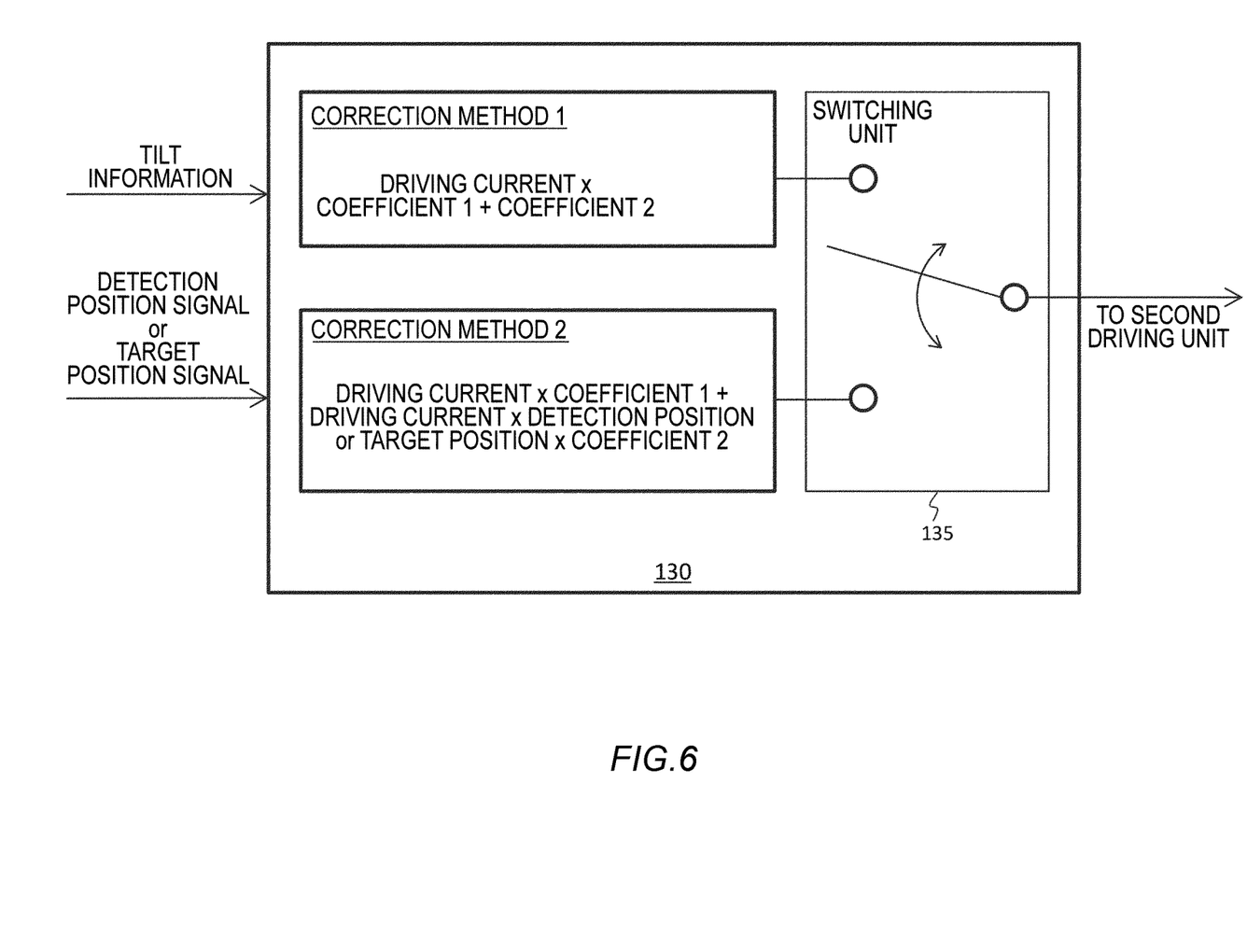
FIG. 6 shows an example of a block diagram of a correction unit 130 in the driving apparatus 100 according to a fifth embodiment.

FIG. 6 shows an example of a block diagram of the correction unit 130 in the driving apparatus 100 according to a fifth embodiment. In the embodiments described above, the case where at least one of the detection position or target position of the lens 30 is definitely used for correcting the driving amount has been described as an example. However, depending on a structure of the actuator (plurality of driving sources 50) or the like, a case of not using the detection position or target position of the lens for the correction calculation may be preferable. Therefore, in the fifth embodiment, the correction unit 130 is configured to be capable of switching whether to use either the detection position or the target position for correcting the driving amount. The correction unit 130 includes a switching unit 135.

The switching unit 135 switches a correction method for correcting the driving amount. For example, as a correction method 1, the correction unit 130 assumes that the driving amount can be corrected using the following expression "corrected driving current=driving current×coefficient 1+coefficient 2". In addition, as a correction method 2, the correction unit 130 assumes that the driving amount can be corrected using the following expression "corrected driving current=driving current×coefficient 1+driving current×detection position or target position×coefficient 2".

In such a case, the switching unit 135 switches the correction method for correcting the driving amount between the correction method 1 and the correction method 2 according to the structure of the actuator or the like. In this manner, in the fifth embodiment, the correction unit 130 may include the switching unit 135 that makes, according to the characteristics of the first driving source 50_1 and the second driving source 50_2, a switch between the correction that uses either the detection position or the target position (for example, the correction method 2, that is, the correction that uses the expression "corrected driving current=driving current×coefficient 1+driving current×detection position or target position×coefficient 2") and the correction that does not use the detection position and the target position (for example, the correction method 1, that is, the correction that uses the expression "corrected driving current=driving current×coefficient 1+coefficient 2". Thus, according to the driving apparatus 100 of the fifth embodiment, an optimum method can be selected according to the characteristics of the actuator to thus correct the driving amount.

Figure 7:
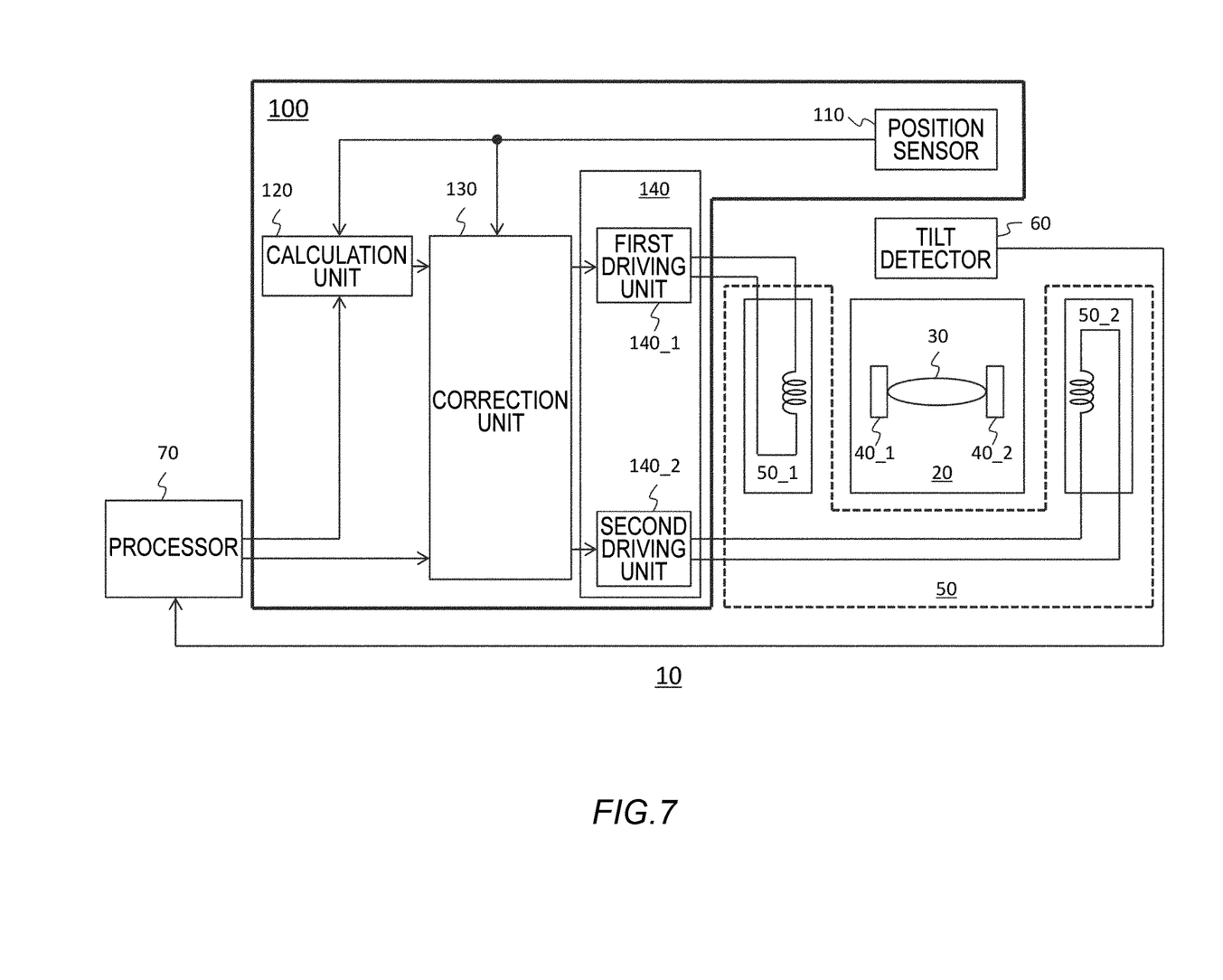
FIG. 7 shows an example of a block diagram of the camera module 10 that may include the driving apparatus 100 according to a sixth embodiment.

FIG. 7 shows an example of a block diagram of the camera module 10 that may include the driving apparatus 100 according to a sixth embodiment. In the present figure, components having the same functions and configurations as those of FIG. 1 are denoted by the same reference numerals, and descriptions thereof will be omitted below except for different points. In the embodiments described above, the case where information representing the tilt of the optical element is acquired in advance has been described as an example. In the sixth embodiment, the tilt of the optical element is detected every time during an actual operation.

In the sixth embodiment, the camera module 10 further includes a tilt detector 60. In addition, the processor 70 is communicably connected to the tilt detector 60 via, for example, serial communication, parallel communication, a network, wireless communication, or the like.

It is to be noted that although the present figure shows an example of a case where the tilt detector 60 is provided outside the driving apparatus 100, the tilt detector 60 may alternatively be built-in in the driving apparatus 100.

The tilt detector 60 detects the tilt of the optical element (lens 30). The tilt detector 60 supplies information representing the detected tilt of the lens to the processor 70.

In the sixth embodiment, the correction unit 130 acquires the information representing the tilt of the lens 30 detected by the tilt detector 60 from the processor 70. Then, when a predetermined coefficient is set as a "coefficient 1'", the correction unit 130 may correct the driving current using the following expression "corrected driving current=driving current×coefficient 1'+tilt information×F (detection position)" which directly uses the tilt information. Herein, F (detection position) is a value that varies depending on the detection position. In this manner, for example, the correction unit 130 may perform feedback so that the tilt of the lens that has been detected during the actual operation becomes equal to or smaller than a predetermined threshold (preferably zero), and thus perform the tilt correction of the lens 30.

While the embodiments of the present invention have been described, the technical scope of the present invention is not limited to the above described embodiments. It is apparent to persons skilled in the art that various alterations and improvements can be added to the above described embodiments. It is also apparent from the description of the claims that the embodiments to which such alterations or improvements are made can be included in the technical scope of the present invention.

The operations, procedures, steps, and stages of each process performed by an apparatus, system, program, and method shown in the claims, specification, or drawings can be performed in any order as long as the order is not indicated by "prior to," "before," or the like and as long as the output from a previous process is not used in a later process. Even if the process flow is described using phrases such as "first" or "next" in the claims, specification, or drawings, it does not necessarily mean that the process must be performed in this order.

EXPLANATION OF REFERENCES

10: camera module;
20: object;
30: lens;
40: magnet;
40_1: first magnet;
40_2: second magnet;
50: plurality of driving sources;
50_1: first driving source;
50_2: second driving source;
50_3: third driving source;
60: tilt detector;
70: processor;

100: driving apparatus;
110: position sensor;
120: calculation unit;
130: correction unit;
130_1: first correction unit;
130_2: second correction unit;
135: switching unit;
140: plurality of driving units;
140_1: first driving unit;
140_2: second driving unit;
140_3: third driving unit.

What is claimed is:

1. A driving apparatus, comprising:
a calculation unit configured to calculate a driving amount of an optical element based on a detected position of the optical element and a target position of the optical element;
a correction unit to which the driving amount, the detected position, and the target position are input, the correction unit being configured to generate a corrected driving amount obtained by correcting the driving amount based on the driving amount, a parameter corresponding to a tilt of the optical element, and either the detected position or the target position, and output the driving amount and the corrected driving amount to autofocus or zoom the optical element;
a first driving unit configured to apply a first driving force corresponding to the driving amount received from the correction unit to a first driving source out of a plurality of driving sources for moving the optical element in a direction of an original optical axis when the optical element is not tilted, wherein the first driving source is for moving a first edge of the optical element a first moved amount in the original optical axis direction; and
a second driving unit configured to apply a second driving force corresponding to the corrected driving amount received from the correction unit to a second driving source out of the plurality of driving sources, wherein the second driving source is for moving a second edge of the optical element, on an opposite side of the optical element to the first edge, a second moved amount in the original optical axis direction.

2. The driving apparatus according to claim 1, wherein the correction unit is configured to correct the driving amount based on a function of the detected position.

3. The driving apparatus according to claim 2, wherein when a predetermined first coefficient is set as a "coefficient 1" and a predetermined second coefficient is set as a "coefficient 2",
the correction unit is configured to correct a driving current corresponding to the driving amount calculated by the calculation unit using an expression "corrected driving current=driving current x coefficient 1+driving current×detected position×coefficient 2".

4. The driving apparatus according to claim 1, wherein the correction unit is configured to correct the driving amount using a correction table predefined based on the detected position and the driving amount.

5. The driving apparatus according to claim 1, wherein the correction unit is configured to correct the driving amount based on a function of the target position.

6. The driving apparatus according to claim 5, wherein when a predetermined first coefficient is set as a "coefficient 1" and a predetermined second coefficient is set as a "coefficient 2",
the correction unit is configured to correct a driving current corresponding to the driving amount calculated by the calculation unit using an expression "corrected driving current=driving current x coefficient 1+driving current x target position x coefficient 2".

7. The driving apparatus according to claim 1, wherein the correction unit is configured to correct the driving amount using a correction table predefined based on the target position and the driving amount.

8. The driving apparatus according to claim 1, wherein the correction unit is configured to be capable of switching whether to use either the detected position or the target position for correcting the driving amount.

9. The driving apparatus according to claim 2, wherein the correction unit is configured to be capable of switching whether to use either the detected position or the target position for correcting the driving amount.

10. The driving apparatus according to claim 3, wherein the correction unit is configured to be capable of switching whether to use either the detected position or the target position for correcting the driving amount.

11. The driving apparatus according to claim 4, wherein the correction unit is configured to be capable of switching whether to use either the detected position or the target position for correcting the driving amount.

12. The driving apparatus according to claim 8, wherein the correction unit includes a switching unit configured to make, according to characteristics of the first driving source and the second driving source, a switch between a correction that uses either the detected position or the target position and a correction that does not use the detected position and the target position.

13. The driving apparatus according to claim 1, wherein the correction unit is configured to select, based on the parameter corresponding to the tilt of the optical element, which of the plurality of driving sources is to be used as a reference for correcting the driving amount.

14. The driving apparatus according to claim 2, wherein the correction unit is configured to select, based on the parameter corresponding to the tilt of the optical element, which of the plurality of driving sources is to be used as a reference for correcting the driving amount.

15. The driving apparatus according to claim 3, wherein the correction unit is configured to select, based on the parameter corresponding to the tilt of the optical element, which of the plurality of driving sources is to be used as a reference for correcting the driving amount.

16. The driving apparatus according to claim 13, wherein the parameter corresponding to the tilt indicates a tilt of the optical element that is detected when a maximum current is caused to flow into each of the plurality of driving sources.

17. The driving apparatus according to claim 1, wherein the calculation unit is configured to calculate the driving amount by feedback control that uses the detected position and the target position.

18. The driving apparatus according to claim 2, wherein the calculation unit is configured to calculate the driving amount by feedback control that uses the detected position and the target position.

19. The driving apparatus according to claim 3, wherein the calculation unit is configured to calculate the driving amount by feedback control that uses the detected position and the target position.

20. A driving method for driving a plurality of driving sources including a first driving source and a second driving source, comprising:

detecting a tilt of an optical element;
generating a parameter corresponding to the tilt of the optical element;
detecting a position of the optical element and outputting a detected position;
calculating a driving amount of the optical element based on the detected position of the optical element and a target position of the optical element;
generating a corrected driving amount obtained by correcting the driving amount based on the driving amount, the parameter corresponding to the tilt of the optical element, and either the detected position or the target position; and
based on the parameter corresponding to the tilt of the optical element, selecting the first driving source to be driven by a first driving force corresponding to the driving amount and selecting the second driving source to be driven by a second driving force corresponding to the corrected driving amount, wherein the first driving source is for moving a first edge of the optical element a first moved amount in an original optical axis direction, and wherein the second driving source is for moving a second edge of the optical element, on an opposite side of the optical element to the first edge, a second moved amount in the original optical axis direction to autofocus or zoom the optical element.

21. The driving apparatus according to claim 1, wherein the first moved amount is different from the second moved amount.

* * * * *